United States Patent [19]
Fisli et al.

[11] Patent Number: 5,543,825
[45] Date of Patent: Aug. 6, 1996

[54] HIGH EFFICIENCY MULTISPOT FACET TRACKED RASTER OUTPUT SCANNING SYSTEM

[75] Inventors: Tibor Fisli, Los Altos Hills; Jean-Michel Guerin, Glendale; Patrick Y. Maeda, Redondo Beach, all of Calif.; Donald J. Quant, Port Byron, N.Y.

[73] Assignee: Xerox Corporation, Stamford, Conn.

[21] Appl. No.: 154,881

[22] Filed: Nov. 17, 1993

[51] Int. Cl.$^6$ ..................................................... B41J 2/47
[52] U.S. Cl. ........................................... 346/141; 347/243
[58] Field of Search .................................. 347/239, 237, 347/243, 255, 247, 260

[56] References Cited

U.S. PATENT DOCUMENTS 4,733,252  3/1988  Daniele et al. ..................... 347/239
5,251,058  10/1993  MacArthur ........................... 347/239

*Primary Examiner*—Mark J. Reinhart

[57] ABSTRACT

The present invention is a novel raster output scanner (ROS) configuration that employs modulated laser diodes as the light source. Each laser diode is coupled to a dedicated driver that modulates the light beam according to digital video signal data. The present invention employs a single-channel acoustic-optic cell that deflects the multiple beams to maintain proper facet tracking. A single transducer is coupled to the single-channel acoustic-optic cell that generates the necessary acoustic wave to maintain proper tracking.

2 Claims, 5 Drawing Sheets

HIGH EFFICIENCY MULTISPOT FACET TRACKED RASTER OUTPUT SCANNING SYSTEM

FIELD OF THE INVENTION

The present invention relates in general to xerographic systems using raster optical scanning (ROS) and, in particular, to xerographic systems employing multispot laser diodes in a facet tracked ROS architecture.

BACKGROUND OF THE INVENTION

Xerographic printing employing raster output scanners (ROS) has evolved along the lines of greater efficiency, higher data throughput rates, improved print quality, lower cost of manufacture, and smaller packaging. These metrics of improved xerographic printing are influenced by various factors. The goal of designing a ROS system is to choose some combination of factors that produces a system that optimizes these metrics.

Efficiency of a ROS system has, in general, two major components: power throughput efficiency and scanning efficiency. Power throughput efficiency is defined as the ratio of the power output of the laser to the power of the beam received at the photoreceptor, as calculated in a "non-dynamic" mode (i.e. no polygon movement). Primarily, power throughput efficiency is a function of the type of illumination the facet receives and of optical element surface losses.

Optical element surface loss is due to undesirable absorption, reflection, and transmission in the various optical elements. While these factors can be controlled to some extent, there comes a point at which no further efficiencies may be achieved at the optical element level. Instead, there are certain system design choices that can be made with the goal of maximizing scanning efficiency.

Three methods of polygon facet illumination are currently practiced in ROS systems: over-filled, under-filled, and facet tracked. As regards efficiency, facet tracking has certain advantages over the other two designs. For example, facet tracking avoids the power throughput loss of over-filled scanning while nearly adopting its perfect scanning efficiency. Likewise, facet tracking avoids the scanning inefficiencies of under-filled scanning while adopting its high power throughput. Thus, facet tracking is generally a better choice of scanning techniques when designing an optimally efficient system.

As mentioned above, another metric of xerographic printing is data throughput. To improve data throughput rates, many present systems employ multiple laser beams to concurrently "write" on the surface of a photoreceptor. The speed-up of the printing process is generally proportional to the number of independently addressable beams writing on the photoreceptor.

One prior art system employing multiple, independently addressable beams in a facet tracked configuration is detailed in sagittal view in FIG. 1. System 10 employs a gas laser 12 as its light source. A pre-modulator lens 14 provides the correct shape of the beam for beam splitter 16a which then splits the input beam into multiple beams (e.g. beams 18a and 18b). The acoustic-optic modulator cell 20 provides multi-channel modulation (e.g. channel 22a and 22b) for the multiple beams.

As will be discussed in greater detail below, A-O cell 20 accomplishes two functions: it modulates the light according to an input video signal and deflects the beams to maintain facet tracking. The output beams from the A-O cell are recombined in beam combiner 16b, transmitted through post modulation optics 24, and reflected by a mirrored facet on a rotating polygon 26. The reflected beams 28 are transmitted through the focusing and polygon wobble correcting optics 30 and imaged onto the surface of photoreceptor 32.

FIG. 2 shows the workings of the A-O cell 20 in greater detail. In order to provide multi-channel modulation, the A-O cell is partitioned into regions (e.g. regions 44 and 46), allowing the various beams (e.g. beams 18a and 18b) to be independently addressable.

To create the partitioning for the different optical channels, individual transducers (e.g. transducers 34 and 36) are coupled to A-O cell. Each transducer transmits the sound wave (e.g. wave 42) that propagates through the channel. As is well known, the frequency of the sound wave determines the angle of deflection of the light beam.

The sound wave for a given channel is generated by a separate driver (e.g. drivers 38 and 40). The drivers accept their own digital video data input in order to modulate the light beams. As mentioned above, the modulation of separate channels by corresponding drivers allows each beam to be individually addressable.

The system, depicted in FIGS. 1 and 2, is not optimal from the standpoint of several metrics. For example, the use of beam splitters and separate acoustic channels operated by dedicated drivers adds greatly to the cost of system manufacture. Moreover, the use of a gas laser as the light source increases the packaging size of the system. For example, gas lasers generally have a minimum size of one inch in diameter and 6 to 8 inches in length. These dimensions represent a lower bound on the size of a optical system employing gas lasers.

Thus, there is a need for a multiple, independently addressable beam ROS system that is not as complex or costly to manufacture. Additionally, there is a need for a multiple beam ROS system that has less of a space requirement than current systems.

It is therefore an object of the present invention to provide a system that employs a multiple, independently addressable beam ROS system that does not require beam splitting and recombining.

It is another object of the present invention to provide a multiple beam, facet tracking ROS system having a lower cost of manufacture.

It is yet another object of the present invention to provide a multi-beam, facet tracked ROS system having a reduced packaging size for the system optics.

It is another object of the present invention to provide a system that employs a method of modulation having faster switching characteristics than a typical A-O cell.

SUMMARY OF THE INVENTION

In summary, the present invention is a novel facet tracking ROS architecture that uses multiple laser diodes as the light source. The laser diodes are individually addressed and modulated at the source by directly switching the diode current, in response to input digital video data signals. The modulated beam is then deflected by a A-O cell to induce the proper tracking of the beam on the effective facet surface. Because the laser light is modulated at the diodes, the present invention need only use a single-channel A-O cell having a single transducer to drive the cell.

One advantage of the present invention is greater data throughput. The present invention modulates the individual laser diodes with electronic switching of the diode current. In general, electronic switching is much faster than the acoustic switching provided a multi-channel A-O cell. Thus, the data throughput rate is greatly increased.

Another advantage of the present invention is power throughput efficiency. The present invention employs laser diodes as opposed to a split beam gas laser source. When, according to the input video data, no useful writing is to be accomplished at the photoreceptor, the present invention turns off the current to the laser diode which has a negligible delay as a lasing element. Turning the diode off reduces power consumption. By contrast, a gas laser has a much greater delay as a lasing element which makes direct modulation impractical. To avoid writing to the photoreceptor with a gas laser, the beam is deflected to a "stop" to insure that it does not reach the photoreceptor. The beam from the gas laser, however, is not turned off and, consequently power is consumed.

Yet another advantage of the present invention is smaller package size. Multispot laser diode packages, in general, are cubic on the order of a quarter inch per side. Thus, a quad pack of laser diodes would take up considerably less space than a gas laser source of one inch in diameter and 6 to 8 inches long.

Yet another advantage of the present invention is lower cost of manufacture. Because multiple laser diodes are independently modulated, there is no need for beam splitters, beam combiners, and multiple channel A-O devices in the present invention. This simplified optical system reduces the cost of manufacture.

Additional objects and features of the present invention will be more readily apparent from the following detailed description of an exemplary embodiment thereof, as illustrated in the accompanying drawings.

DETAILED DESCRIPTION OF THE PREFERRED EMBODIMENTS

The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the present invention as defined by the appended claims. Thus, the present invention is not intended to be limited to the embodiment shown, but is to be accorded the widest scope consistent with the principles and features disclosed herein.

Figure 3:
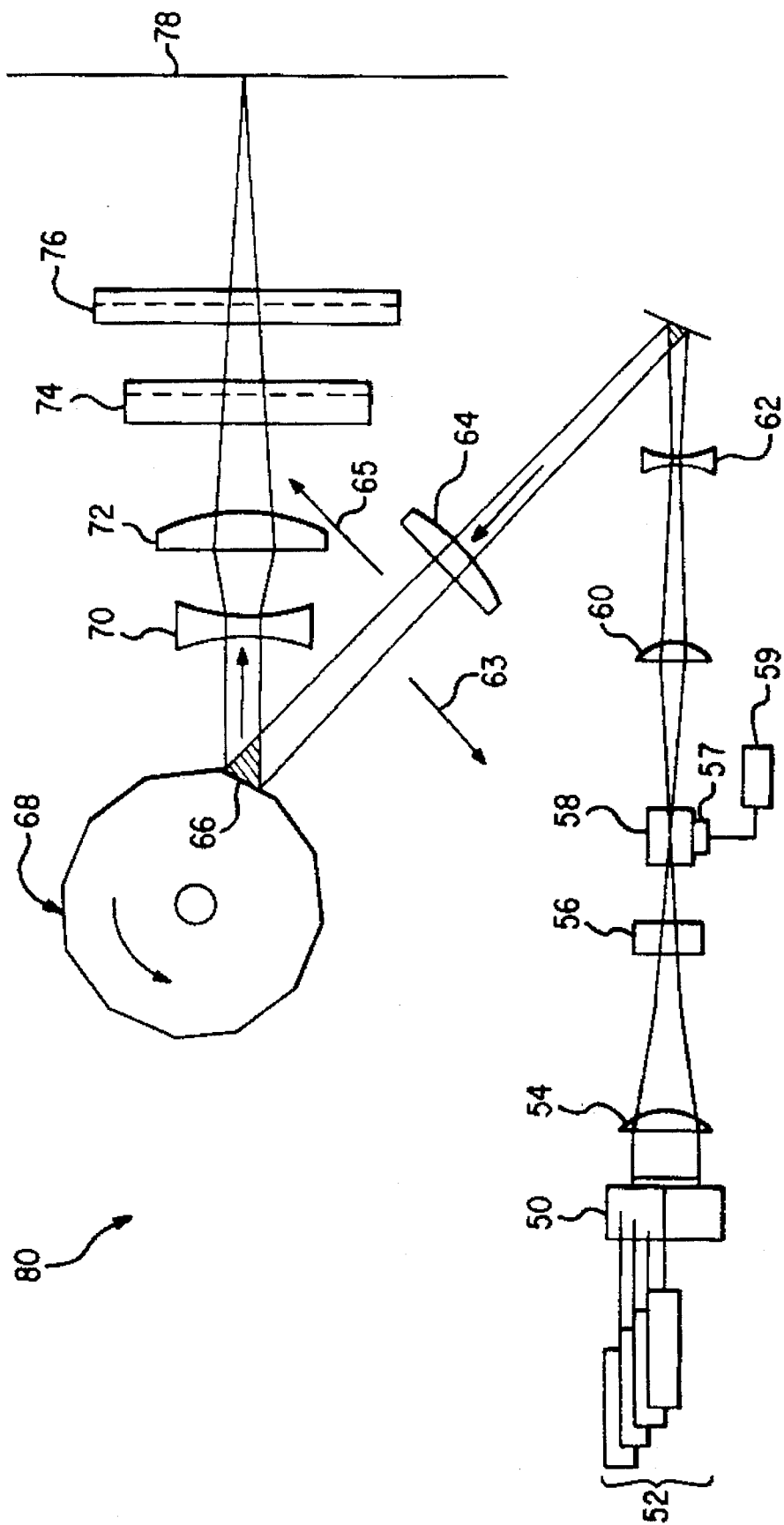
FIG. 3 is a tangential view of the optical path of a preferred embodiment made in accordance with the principles of the present invention.

Referring to FIG. 3, a tangential view of the optical path of the presently preferred embodiment 80 is shown. The light source of the system is a quad-pack of laser diodes 50 with each diode positioned on top of one another in the sagittal plane (as seen clearly in FIG. 4). It will be appreciated that various configurations of laser diodes are well known in the art and that the present invention should not be limited to the particular four-by-one configuration disclosed in the presently preferred embodiment. For example, quad-packs with diodes positioned two-by-two are also well known.

Figure 1:
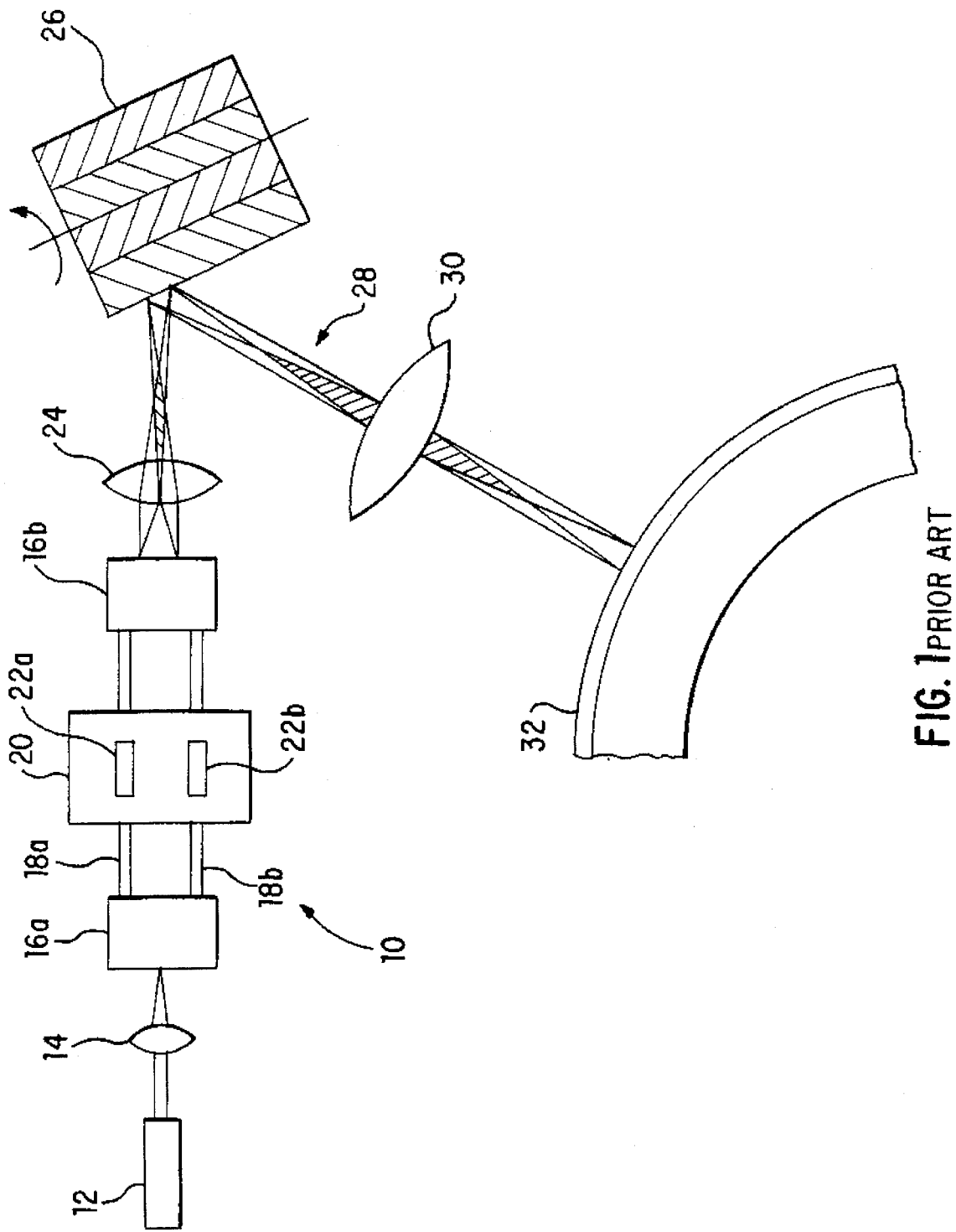
FIG. 1 is a layout of a prior art facet tracking ROS system that employs multiple laser beams. The single gas laser source beam is split into multiple beams using a beam splitter.
Figure 2:
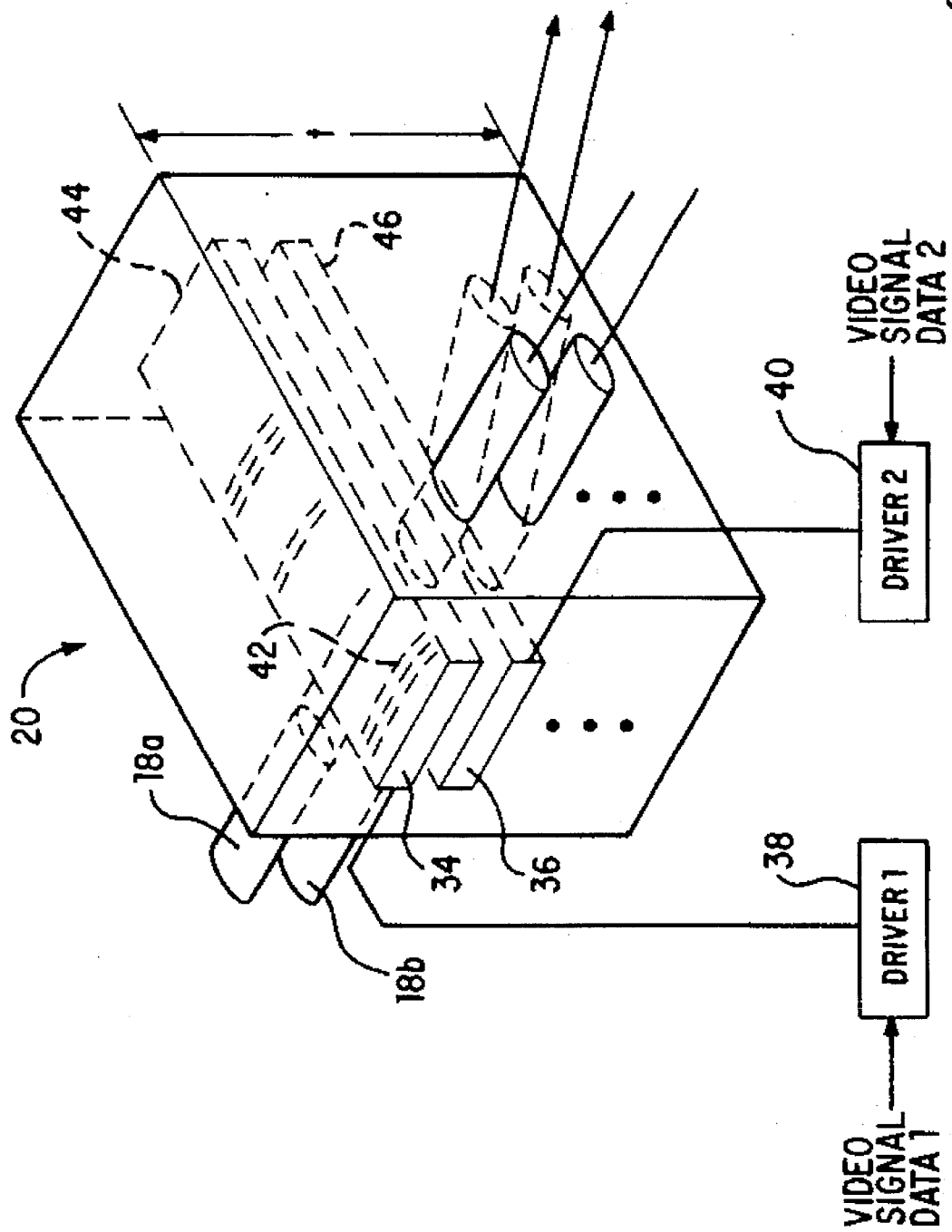
FIG. 2 shows the design of a multiple channel acoustic-optic cell as used in the system depicted in FIG. 1. Each channel is modulated by a dedicated transducer in order to make each beam individually addressable.

To be independently addressable, separate drivers 52 are dedicated to each individual laser diodes in the quad-pack. As is well known in the art, diodes are modulated by switching the current to the diode on and off, according to input video signal data. The speed of switching is limited, in general, by the speed of the driver electronics, since the speed of the laser diode itself is practically unlimited. However, electronic switching, in general, is much faster than the acoustic switching provided in FIG. 2. Thus, the data throughput of the present invention is much greater than previous multiple beam ROS systems.

As the light emanates from laser diodes 50, the light is focused onto single-channel A-O cell 58 by cylindrical lenses 54 and 56. Because the light from the diodes is individually modulated, there is no need in the present invention for an A-O cell with multiple channels driven by separate transducers. Instead, A-O cell 58 is driven by a single transducer 57 which, in turn, is driven by a single driver 59 that smoothly induces the input beams to deflect through an angle to maintain proper facet tracking. The path of beam deflection is depicted as moving along tracking arrow 65 and return arrow 63. It will be appreciated that the method of maintaining a proper angle and subsequent parallel beam displacement for facet tracking is well known in the art.

After the light beams have been deflected by A-O cell 58, the beams are focused in the sagittal meridian onto effective facet 66 by spherical lens 60, cylindrical lens 62, and spherical lens 64. The effective facet is caused to move through an angular and translational displacement as polygon 68 rotates. Facet tracking insures that the beams stay centered on the facet throughout all positions in which the facet may effectively reflect light to the photoreceptor 78.

After the light is thus reflected, the beams are again focused by cylindrical lenses 70 and 72, negative cylindrical lens 74 and concave cylindrical mirror 76. The focused beams impinge upon the surface of photoreceptor 78 to produce the effective "writing" of the system.

Figure 4:
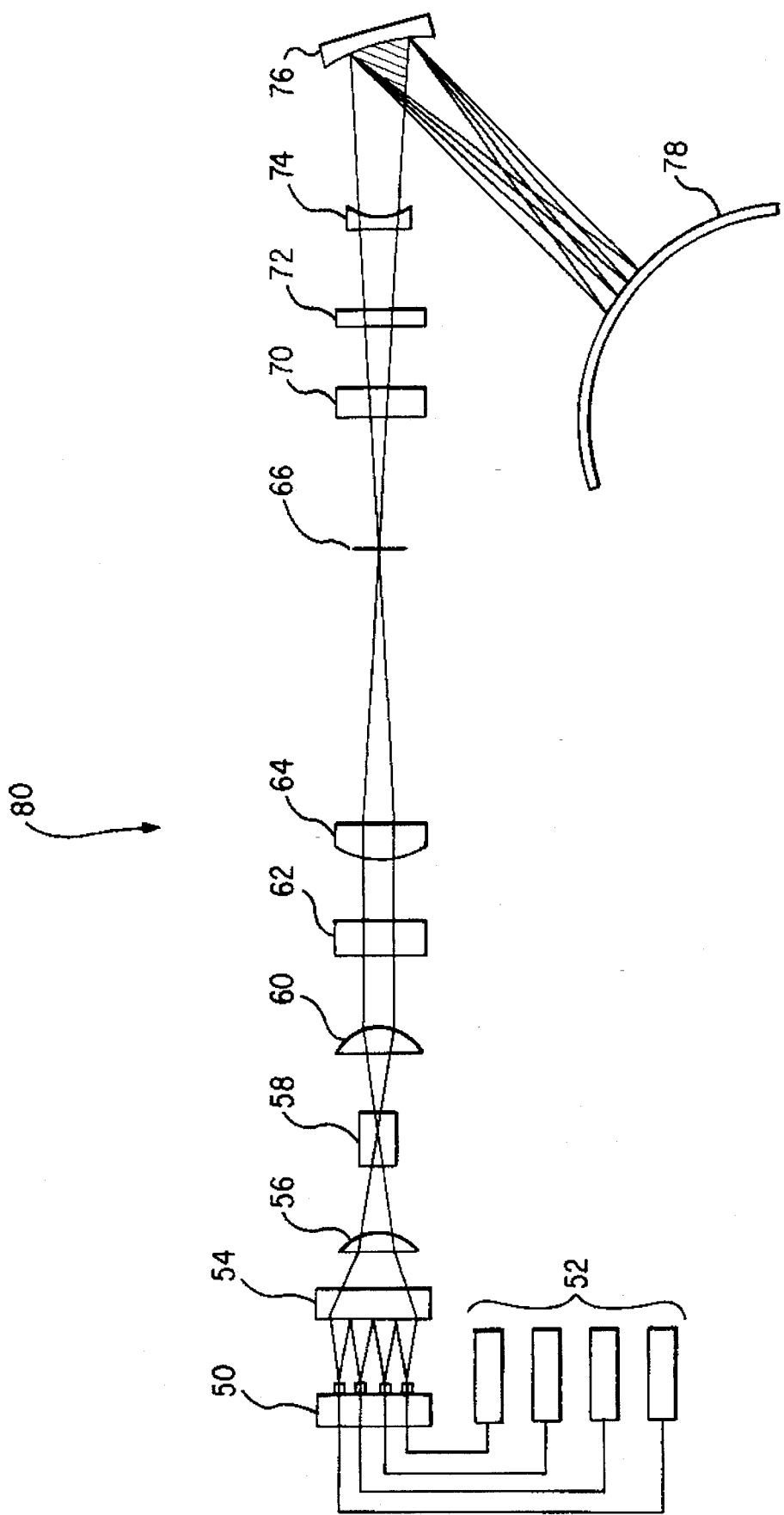
FIG. 4 is an unfolded sagittal view of the optical path displayed in FIG. 3.

A sagittal view of a presently preferred embodiment 80 is shown in FIG. 4. As can be seen from this view, the laser diodes are positioned so that their beams ride on top of each other in this plane. Dedicated drivers 52 are coupled to individual diodes 50 to provide individual addressability. Also seen, the four light beams image the photoreceptor surface 78 on top of each other. It will be appreciated that the beams could be staggered by some interlacing scheme in order to accommodate the optical system design as well as to produce a smoother output to the human eye. It will also be appreciated that other optical design configurations are possible. For example, lenses 54 and 56, lenses 60 and 62, and lenses 70 and 72 could each be constructed as single elements. Other optical design modifications are possible without detracting from the thrust of the present invention. Thus, the present invention should not be limited to the particular embodiment shown in FIG. 3 and 4.

Figure 5A:
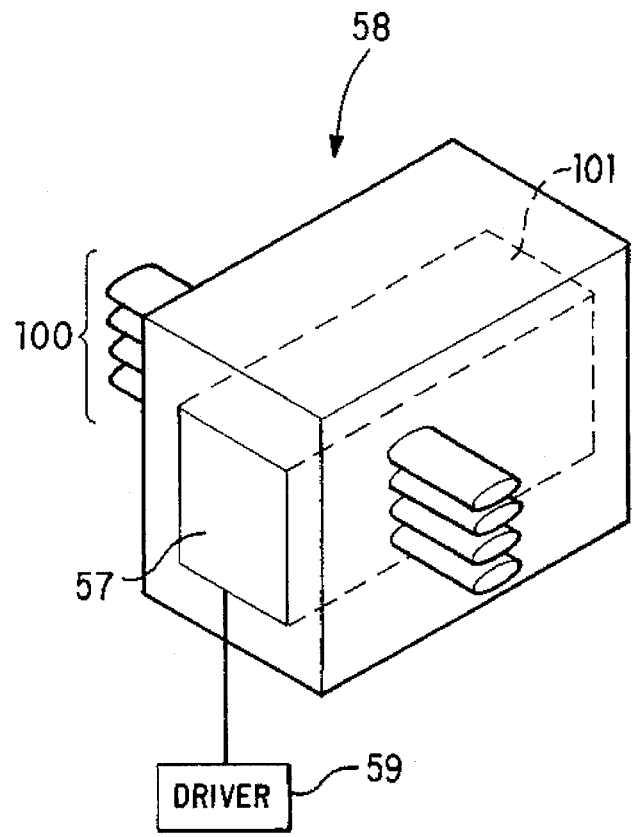
FIG. 5A is a cut-away perspective drawing of a single-channel A-O cell having one transducer. Four light beams are depicted traversing the cell.
Figure 5B:
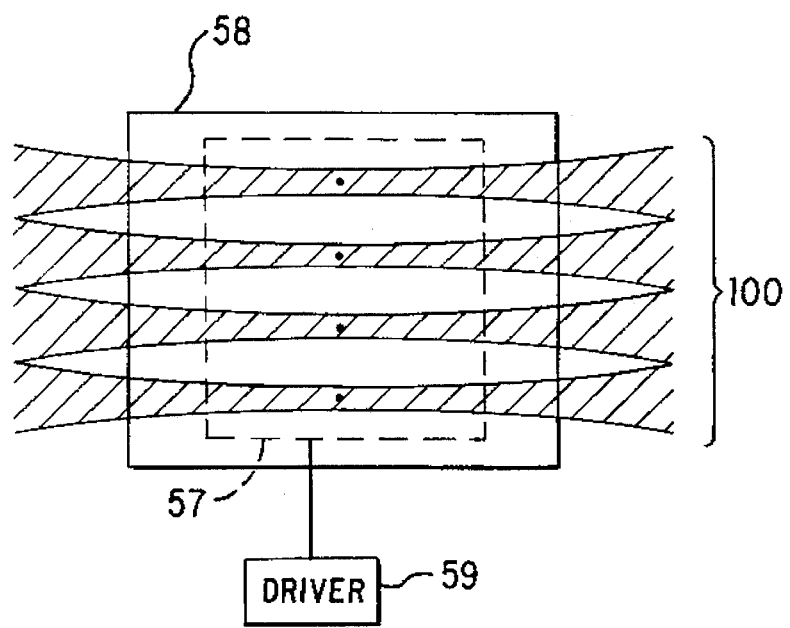
FIG. 5B is a cut-away, sagittal view of a single-channel A-O cell. The sagittal waists of the four beams are shown.

FIG. 5A is a cut-away, perspective view of the single-channel A-O cell as used in the present invention. As can be seen, the four light beams 100 enter the A-O cell and are deflected by a single-channel 101 that is produced by transducer 57. Because transducer 57 is driven by a single driver 59, all the beams that are in the channel 101 at the same time are affected the same. It will be appreciated that because the beams are modulated at the source, there will be times in which not all four beams illuminate the A-O cell simultaneously. FIG. 5B is a sagittal view of the single-channel A-O cell shown in FIG. 5A.

In summary, the present invention provides a novel system architecture which improves on the typical facet tracking ROS configuration. The present invention employs a set of laser diodes which are individually modulated at the source. Because the system modulates its multiple laser diodes at the source, the optical system of the present invention can use a single-channel A-O cell to achieve the necessary beam deflection for proper facet tracking, as opposed to a multiple channel/multiple transducer A-O cell. Additionally, the present invention does not need to use beam splitters and recombiners to produce multiple beams from one source. Thus, the cost of manufacturing the present invention is less than previous systems.

The present invention also improves the data throughput rate as compared with previous systems. The switching speed of the electronics need to modulate the individual laser diodes is faster than the acoustic switching used in a multiple channel A-O cell.

The present invention reduces the required packaging size of multiple beam facet tracking ROS systems. Laser diodes are in general orders of magnitude smaller than their gas laser counterparts.

What is claimed:

1. An apparatus for high efficiency raster output scanning in a facet tracking architecture, the apparatus comprising a rotating mirror polygon having trackable facets;

a plurality of laser diodes each configured to emit a laser beam directed toward trackable facets of the rotating mirror polygon;

a plurality of dedicated drivers, with each laser diode coupled to at least one dedicated driver to modulate intensity of the laser beam; and a single-channel acoustic-optic cell positioned between trackable facets of the rotating mirrored polygon and the plurality of laser diodes, the single-channel acoustic-optic cell being controlled to deflect the laser beams as required to maintain facet tracking of trackable facets of the rotating mirror polygon.

2. An improved apparatus as recited in claim 1 wherein dedicated drivers provide a output stream of signals that correspond to video data.

\* \* \* \* \*